US009548071B2

(12) United States Patent
Isokawa

(10) Patent No.: US 9,548,071 B2
(45) Date of Patent: Jan. 17, 2017

(54) STORAGE APPARATUS, CONTROLLER AND CONTROL METHOD

(71) Applicant: Kabushiki Kaisha Toshiba, Minato-ku, Tokyo (JP)

(72) Inventor: Hiroshi Isokawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/948,055

(22) Filed: Nov. 20, 2015

(65) Prior Publication Data

US 2016/0322075 A1 Nov. 3, 2016

(30) Foreign Application Priority Data

Apr. 28, 2015 (JP) ................................ 2015-092227

(51) Int. Cl.

| | |
|---|---|
| ***G11B 27/36*** | (2006.01) |
| ***G11B 20/20*** | (2006.01) |
| ***G11B 5/596*** | (2006.01) |
| ***G11B 5/012*** | (2006.01) |
| *G11B 5/00* | (2006.01) |

(52) U.S. Cl.

CPC .......... *G11B 5/59627* (2013.01); *G11B 5/012* (2013.01); *G11B 2005/0021* (2013.01)

(58) Field of Classification Search

CPC ....... G11B 5/012; G11B 5/00; G11B 5/59633; G11B 5/59627; G11B 5/54; G11B 5/6005; G11B 5/596; G11B 5/5547

USPC ..... 360/51, 75, 31, 55, 62, 27, 77.02, 77.04, 360/78.04, 76

See application file for complete search history.

(56) References Cited

U.S. PATENT DOCUMENTS

| | | | | |
|---|---|---|---|---|
| 7,215,502 | B2 | 5/2007 | Tagami | |
| 7,881,004 | B2 * | 2/2011 | Kumbla ............ | G11B 5/59644 360/31 |
| 8,837,065 | B1 * | 9/2014 | Mircea ............ | G11B 20/10305 360/31 |
| 2006/0050428 | A1 * | 3/2006 | Brittenham ........... | G11B 5/584 360/75 |

FOREIGN PATENT DOCUMENTS

| | | | |
|---|---|---|---|
| JP | 06-302090 | A | 10/1994 |
| JP | 11-339409 | A | 12/1999 |
| JP | 2000-123302 | A | 4/2000 |
| JP | 2006-099852 | A | 4/2006 |

* cited by examiner

*Primary Examiner* — Nabil Hindi
(74) *Attorney, Agent, or Firm* — White & Case LLP

(57) ABSTRACT

A storage apparatus of an embodiment includes a magnetic disk, a head, and a controller. The head includes a writing unit that outputs a magnetic field to record write data into a recording region of the magnetic disk to which light is irradiated and a reading unit that reads read data from the recording region of the magnetic disk. Based on a first spectrum of first read data read by the reading unit at a first position of the magnetic disk and a second spectrum of second read data read by the reading unit at a second position which is a following position of the first position, the controller detects whether an offset of the writing unit occurs while writing into the recording region of the magnetic disk is performed by the writing unit.

10 Claims, 12 Drawing Sheets

1/12
100
101
102
103
104
107
108
110
110w, 110r
50
120
HEAD CONTROL UNIT
123
WRITE CURRENT CONTROL UNIT
123a
READ SIGNAL DETECTION UNIT
123b
LIGHT CONTROL UNIT
123c
STORAGE UNIT
125
RWC
124
POWER CONTROL UNIT
121
SPINDLE MOTOR CONTROL UNIT
121a
VOICE COIL MOTOR CONTROL UNIT
121b
HARD DISK CONTROL UNIT
122
HOST
HS

MAGNETIC HEAD
110
315
316
321
HEAD CONTROL UNIT (PREAMPLIFIER)
123
123c
LIGHT CONTROL UNIT
WRITE DATA
313
LIGHT CONTROL SIGNAL
314
322
READ DATA
RWC
124
312
324
323
THRESHOLD
HARD DISK CONTROL UNIT
122
311
122a HOST I/F
331
332
333
STORAGE UNIT
LIGHT CONSTANT INFORMATION
WRITE FREQUENCY INFORMATION
LIGHTCURRENT INFORMATION
125

MAGNETIC HEAD MOVING DIRECTION
501
HEATED SPOT
61
WRITING MAGNET-IC POLE
502
522
521
510
SERVO REGION

PREAMBLE (2T)
Data PART
0 1 0 0 0 1 1 0 1 1 0 0 1 0
WRITE CURRENT PATTERN (A)
LASER DIODE EMISSION PATTERN (B)
H
L
601

124
READ/WRITE CHANNEL
WRITE DATA
313
LIGHT CONTROL SIGNAL
314
READ DATA
322
401
WRITE DATA GENERATION CIRCUIT
402
CLOCK GENERATION CIRCUIT
434
403
LIGHT CONTROL SIGNAL GENERATION CIRCUIT
411
SPECTRUM GENERATION CIRCUIT
432
412
SPECTRUM STORAGE UNIT
433
431
413
SPECTRUM COMPARISON UNIT
312
WRITE FREQUENCY INFORMATION
332
LIGHT CONSTANT INFORMATION
331
WRITING OPERATION STOP SIGNAL
THRESHOLD (Amp_th)
323

SECOND HEAD POSITION
(T)
FIRST HEAD POSITION
(t1)
HEATED SPOT
HEATED SPOT
WRITING MAGNET-IC POLE
WRITING MAGNET-IC POLE
6
6
61
61
1101
1102
1103
1104
1111
SERVO REGION
HEAD MOVING DIRECTION

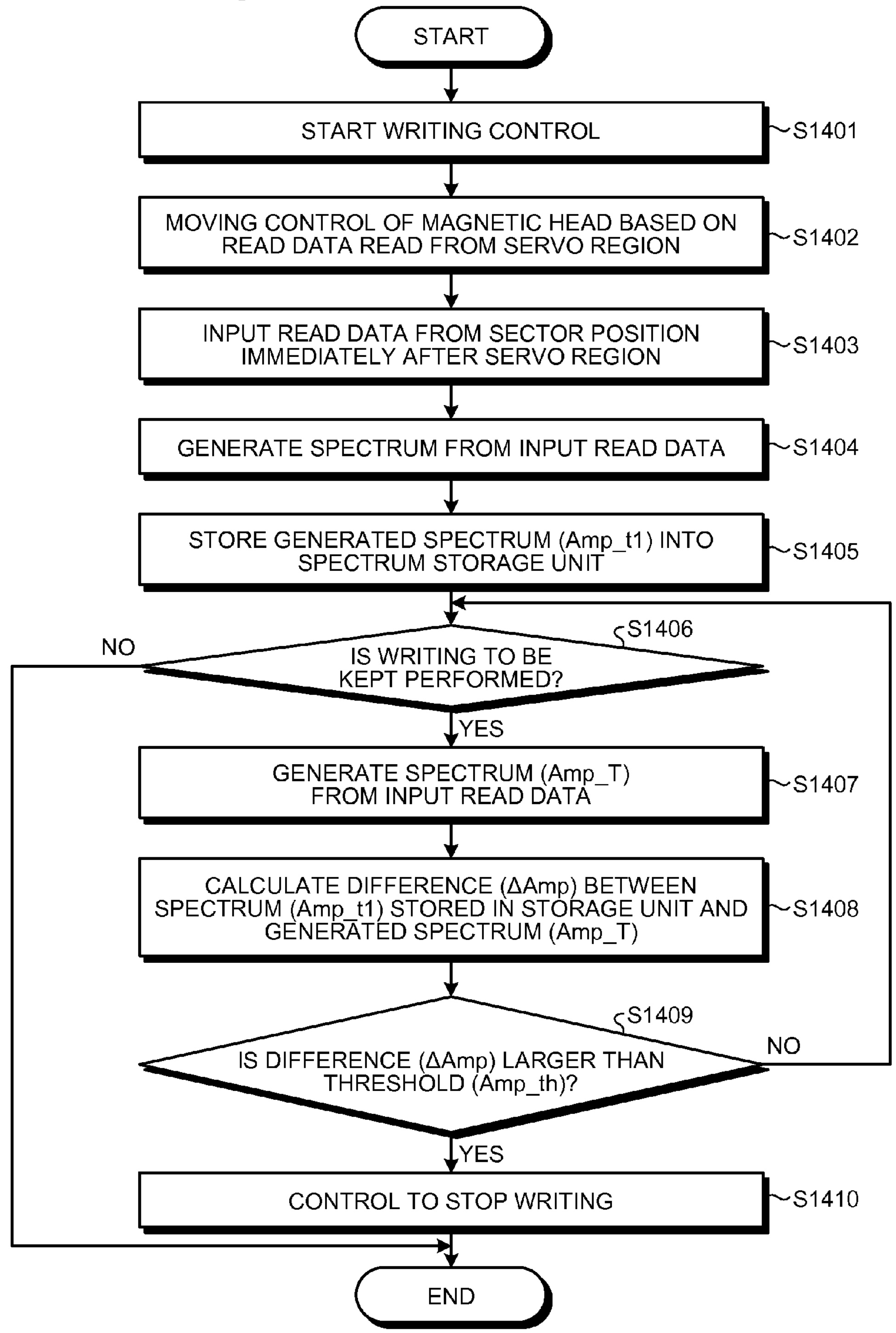
FIG.14
START
START WRITING CONTROL
S1401
MOVING CONTROL OF MAGNETIC HEAD BASED ON READ DATA READ FROM SERVO REGION
S1402
INPUT READ DATA FROM SECTOR POSITION IMMEDIATELY AFTER SERVO REGION
S1403
GENERATE SPECTRUM FROM INPUT READ DATA
S1404
STORE GENERATED SPECTRUM (Amp_t1) INTO SPECTRUM STORAGE UNIT
S1405
S1406
IS WRITING TO BE KEPT PERFORMED?
NO
YES
GENERATE SPECTRUM (Amp_T) FROM INPUT READ DATA
S1407
CALCULATE DIFFERENCE (ΔAmp) BETWEEN SPECTRUM (Amp_t1) STORED IN STORAGE UNIT AND GENERATED SPECTRUM (Amp_T)
S1408
S1409
IS DIFFERENCE (ΔAmp) LARGER THAN THRESHOLD (Amp_th)?
NO
YES
CONTROL TO STOP WRITING
S1410
END

STORAGE APPARATUS, CONTROLLER AND CONTROL METHOD

CROSS-REFERENCE TO RELATED APPLICATIONS

This application is based upon and claims the benefit of priority from Japanese Patent Application No. 2015-092227, filed on Apr. 28, 2015; the entire contents of which are incorporated herein by reference.

FIELD

An embodiment of the present invention relates to a storage apparatus, a controller, and a control method.

BACKGROUND

Conventionally, in a magnetic recording medium such as a hard disk, induction of a magnetic head to perform writing into the magnetic recording medium is performed by using a servo region provided in the magnetic recording medium.

Recently, as a method of writing into the magnetic recording medium, a heat-assisted recording method is proposed. In the heat-assisted recording method, emission light from a light source is converted into irradiation light by an irradiation unit and is irradiated to a part of a recording surface of the magnetic recording medium (magnetic disk), the magnetic recording medium is regionally heated, and writing control is performed magnetically with respect to the magnetic recording medium with decreased coercivity. As an example of the light source, there is a laser element. When the laser element is used, a laser beam is output as the output light. As an example of the irradiation unit, there is a near-field light element. When the near-field light element is used, near-field light is emitted as the irradiation light. By using the heat-assisted recording method, an improvement of a surface recording density is expected.

However, as the surface recording density is improved, a magnetic head may be deviated from a track when disturbance is generated.

BRIEF DESCRIPTION OF THE DRAWINGS

FIG. 14 is a flowchart illustrating a procedure of the writing control in the magnetic disk apparatus of the embodiment.

DETAILED DESCRIPTION

A storage apparatus of an embodiment includes a magnetic disk, a head, and a controller. The head includes a writing unit that outputs a magnetic field to record write data into a recording region of the magnetic disk to which light is emitted and a reading unit that reads read data from the recording region of the magnetic disk. Based on a first spectrum of first read data read by the reading unit at a first position of the magnetic disk and a second spectrum of second read data read by the reading unit at a second position which is a following position of the first position, the controller detects whether an offset of the writing unit occurs while writing into the recording region of the magnetic disk is performed by the writing unit.

In the following, a magnetic disk apparatus according to an embodiment will be described in detail with reference to the attached drawings. Note that the present invention is not limited to this embodiment.

Figure 1:
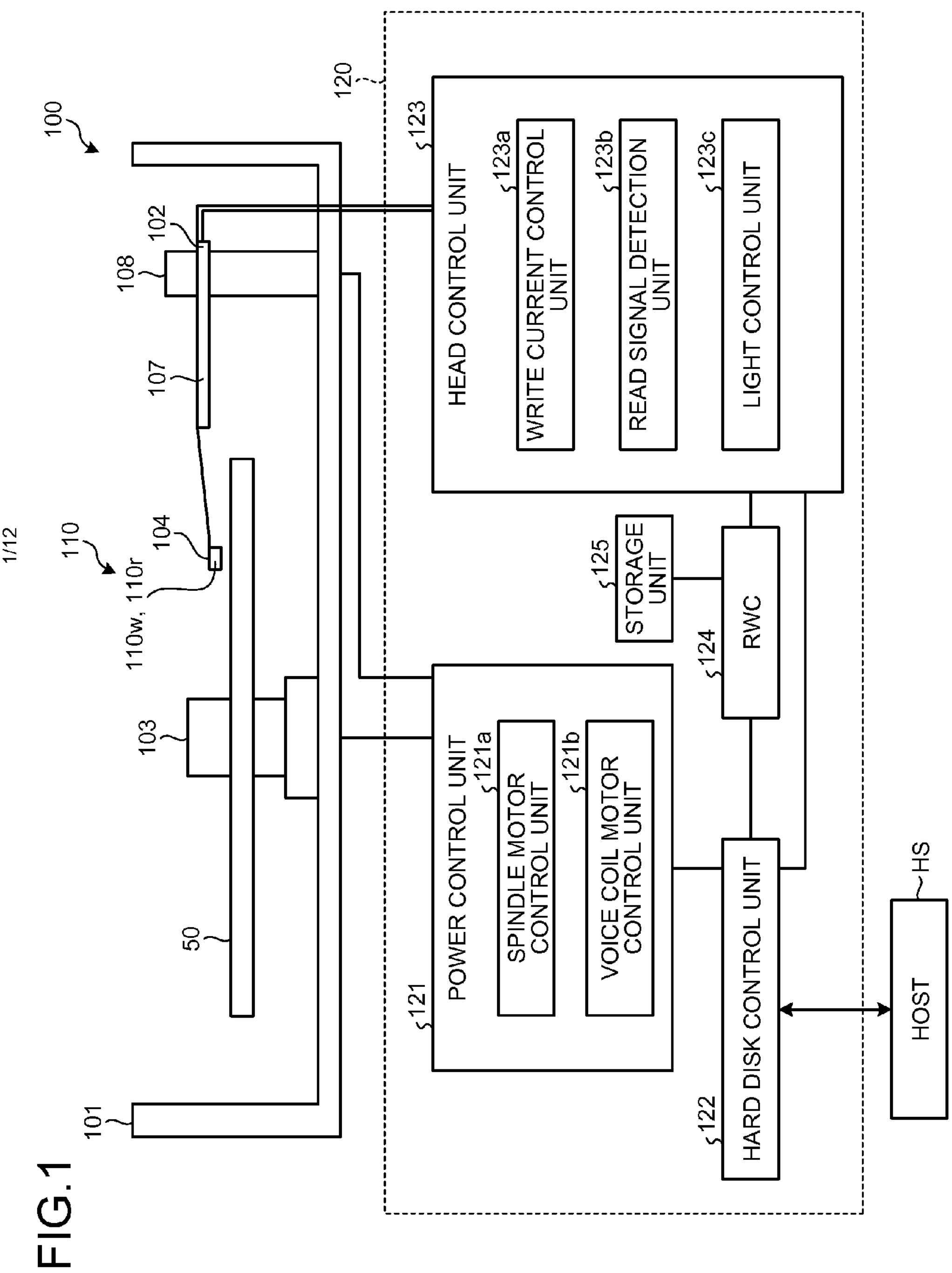
FIG. 1 is a view illustrating a cross-sectional configuration of a part of a magnetic disk apparatus of an embodiment and a functional configuration of other part thereof.

A magnetic disk apparatus 100 according to an embodiment will be described. FIG. 1 is a view illustrating a cross-sectional configuration of a part of the magnetic disk apparatus 100 and a functional configuration of other part thereof.

As illustrated in FIG. 1, the magnetic disk apparatus 100 comprises a case 101, a voice coil motor 102, a spindle motor 103, a head slider 104, an arm 107, a shaft 108, a magnetic head 110, a magnetic disk 50, and a magnetic recording control unit 120. In the magnetic disk apparatus 100 of the present embodiment, the magnetic disk 50, the magnetic head 110, the voice coil motor 102, and the spindle motor 103 are housed in the case 101.

The magnetic disk 50 is a disk-shaped recording medium to record various kinds of information and is rotatably driven by the spindle motor 103. The magnetic disk 50 includes a vertical recording layer having an anisotropic aspect in a vertical direction with respect to a surface. The magnetic disk 50 includes, for example, a plurality of concentric tracks around a vicinity of a rotation center of the spindle motor 103.

Writing/reading of data into/from the magnetic disk 50 is performed by the magnetic head 110 provided, via the head slider 104, to one leading end of the arm 107 being a head supporting mechanism.

The magnetic head 110 includes a write head 110*w* and a read head 110*r*. The magnetic head 110 is provided on a trailing-side of the head slider 104. By lift force generated by a rotation of the magnetic disk 50, the magnetic head 110 moves relatively in a down-track direction with respect to the surface of the magnetic disk 50 while slightly floating from the surface of the magnetic disk 50.

The write head 110*w* of the present embodiment writes information into a recording region of the magnetic disk 50 while floating slightly from the surface of the magnetic disk 50 due to the lift force. According to the heat-assisted recording method, the write head 110*w* converts a laser beam into near-field light with a near-field light element 5 (see FIG. 2) and emits the converted near-field light into a part of the surface of the magnetic disk 50. A temperature of the magnetic disk 50 is regionally increased due to the irradiation. To the part where the temperature is increased, a magnetic field is applied by the write head 110*w* and information is magnetically recorded. That is, the write head 110*w* is used for a writing operation, with respect to the magnetic disk 50, according to the heat-assisted recording method.

The read head 110*r* reads information (read data) from the magnetic field of the magnetic disk 50. The read head 110*r* of the present embodiment reads and reproduces the information recorded in the magnetic disk 50 while floating slightly from the surface of the magnetic disk 50 due to the lift force. That is, the read head 110*r* is used for a reading operation with respect to the magnetic disk 50.

By driving of the voice coil motor 102 which is a head driving mechanism provided to the other end of the arm 107, the arm 107 rotates around the shaft 108. By the rotation, each of the write head 110*w* and the read head 110*r* moves on an arc in a cross-track direction of the magnetic disk 50 and changes a track which is an object of reading/writing.

The magnetic recording control unit 120 includes a head control unit 123, a power control unit 121, a read/write channel (RWC) 124, a hard disk control unit 122, and a storage unit 125. The head control unit (preamplifier) 123 includes a write current control unit 123*a*, a read signal detection unit 123*b*, and a light control unit 123*c*. The power control unit 121 includes a spindle motor control unit 121*a* and a voice coil motor control unit 121*b*. The storage unit 125 includes, for example, a RAM, a ROM, or a non-volatile memory.

Based on a write signal from the RWC 124, the write current control unit 123*a* performs current control to perform an output to the write head 110*w*.

Based on the signal input from the read head 110*r*, the read signal detection unit 123*b* inputs read data into the RWC 124.

For control of a writing operation by the heat-assisted recording method, the light control unit 123*c* controls a light source (such as laser diode) (not illustrated) to emit light from a near-field light element (not illustrated) of the write head 110*w*.

According to an instruction from the hard disk control unit 122, the spindle motor control unit 121*a* controls the spindle motor 103. According to the instruction from the hard disk control unit 122, the voice coil motor control unit 121*b* controls the voice coil motor 102.

The write head 110*w* of the magnetic head 110 of the present embodiment at least includes an irradiation unit (near-field light element 5) to emit light to the magnetic disk 50 and a writing magnetic pole 61 (write element) to output a recording magnetic field to record write data into a recording region of the magnetic disk 50 to which light is emitted by the irradiation unit.

The irradiation unit (near-field light element 5) can switch on and off of emitted light according to control by the light control unit 123*c*.

Figure 2:
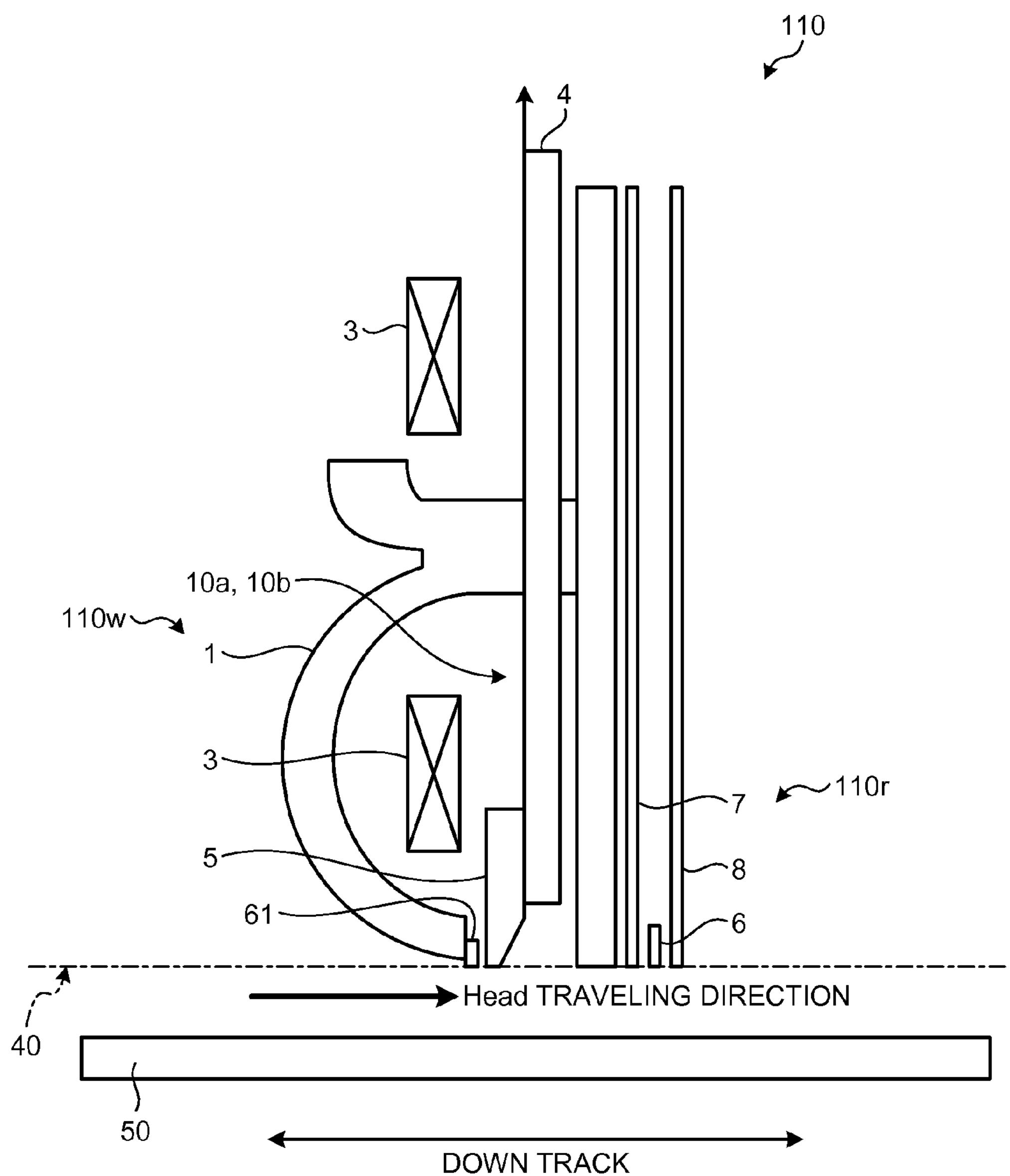
FIG. 2 is a sectional view in a down-track direction of a magnetic head of the embodiment.

Next, a detail configuration of the write head 110*w* and the read head 110*r* of the magnetic head 110 will be described. FIG. 2 is a sectional view in a down-track direction of the magnetic head 110.

In the example illustrated in FIG. 2, a left side on a plane of paper is assumed as a trailing-side of the head slider 104 and a right side of the plane of the paper is assumed as a leading side thereof.

The magnetic head 110 includes the write head 110*w* on the trailing-side and the read head 110*r* on the leading side. In other words, in the magnetic head 110, the write head 110*w* is arranged close to the trailing-side compared to the read head 110*r*.

The read head 110*r* includes a magnetoresistive element (read element) 6, a shield 7, and a shield 8. The shield 7 and the shield 8 are arranged in such a manner as to sandwich the magnetoresistive element 6 from both sides in a head traveling direction. Accordingly, the magnetoresistive element 6 reads information (hereinafter, also referred to as read data) recorded in the magnetic disk 50 while being magnetically shielded by the shield 7 and the shield 8 from the both sides in the head traveling direction.

The write head 110*w* includes a writing magnetic pole 61, a magnetic core 1, a recording coil 3, a waveguide 4, and a near-field light element 5.

On the trailing-side of the near-field light element 5 and the waveguide 4, the writing magnetic pole 61 is arranged on an ABS surface 40. For example, the writing magnetic pole 61 is arranged in such a manner that an end surface on a side of the magnetic disk 50 is placed on the ABS surface 40. The writing magnetic pole 61 is arranged in a vicinity of the near-field light element 5 and includes a soft magnetic material.

The magnetic core 1 is connected to the writing magnetic pole 61 in such a manner that a magnetic field is generated from a part, which is on a side of the ABS surface 40, of the writing magnetic pole 61. The magnetic core 1 is protruded from an upper side in FIG. 2 of the near-field light element 5 to the trailing-side and is extended downward to the side of the ABS surface 40. The magnetic core 1 is connected to the writing magnetic pole 61. The magnetic core 1 includes a soft magnetic material.

On the trailing-side of the near-field light element 5 and the waveguide 4, the recording coil 3 is arranged in such a manner as to wind around the magnetic core 1. The recording coil 3 is winded around the magnetic core 1 along a flat surface in a direction vertical to the plane of the paper in FIG. 2. Accordingly, by controlling current which flows in the recording coil 3, the writing magnetic pole 61 generates a magnetic field through the magnetic core 1 and magnetically records information into the magnetic disk 50. The recording coil 3 includes, for example, a conductive metal (such as Cu).

The waveguide 4 is extended to a vicinity of the near-field light element 5 from the light source (such as laser diode not illustrated). Accordingly, the waveguide 4 guides, to the near-field light element 5, light (such as laser beam) emitted from the light source. Note that in the example illustrated in FIG. 2, an example in which the waveguide 4 has a tabular shape is illustrated. However, a different shape (such as rectangular shape) may be included as long as light can be guided to the near-field light element 5 in the structure.

The near-field light element 5 is arranged on the ABS surface 40. The near-field light element 5 converts the guided light (such as laser beam) into near-field light and emits the near-field light to a part on the surface of the magnetic disk 50 on which part recording is to be performed by the writing magnetic pole 61. Accordingly, the part on the surface of the magnetic disk 50 on which part recording is to be performed by the writing magnetic pole 61 is heated. Thus, a vertical recording layer at the part is heated to around a Curie point and an anisotropy field becomes small, whereby the writing magnetic pole 61 can easily perform recording of information.

Figure 3:
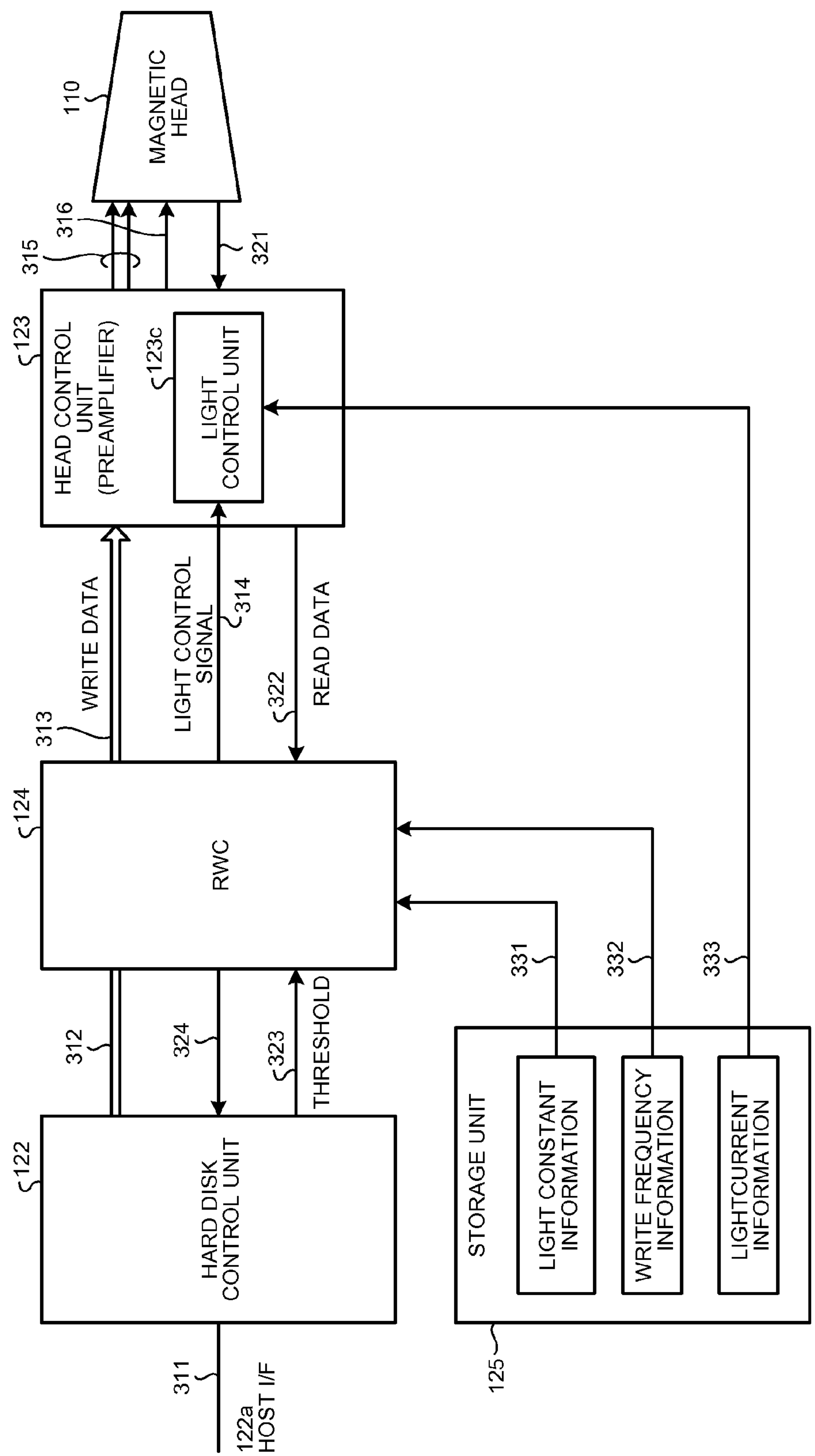
FIG. 3 is a view illustrating an example of a signal transmitted/received between configurations of the magnetic disk apparatus of the embodiment.

FIG. 3 is a view illustrating a signal transmitted/received between configurations of the magnetic disk apparatus 100 of the present embodiment.

As illustrated in FIG. 3, according to a command and/or data 311 received from a host HS (not illustrated) through a host I/F, the hard disk control unit 122 generates predetermined data 312 and outputs the generated data to the RWC 124.

The RWC 124 performs control corresponding the predetermined data 312. For example, according to a writing instruction and corresponding data received from the host HS, the RWC 124 generates data (hereinafter, referred to as write data) 313 to be written into the magnetic disk 50. Then, the RWC 124 outputs the write data 313 to the head control unit 123 at a frequency which is based on write frequency information 332 stored in the storage unit 125.

Also, the RWC 124 generates a light control signal 314. Then, the RWC 124 outputs, to the head control unit 123, a light control signal 314 which is generated based on light constant information 331 stored in the storage unit 125 and a frequency which is based on write frequency information 332. Note that the light control signal 314 is a control signal of a drive current to control on/off of the light source with the head control unit 123.

The head control unit 123 includes the light control unit 123*c* and performs control of the magnetic head 110. For example, the head control unit 123 generates current (hereinafter, referred to as write current) 315 to write magnetic information corresponding to the write data 313 and supplies the write current 315 to the magnetic head 110. Accordingly, the writing magnetic pole 61 of the magnetic head 110 generates a magnetic field corresponding to the write current 315 and writes data into the magnetic disk 50.

Before writing data into the magnetic disk 50, the head control unit 123 previously acquires lightcurrent information 333 from the storage unit 125. The lightcurrent information 333 is setting to generate a drive current 316 to drive a light source and holds, for example, a maximum value or a minimum value of the current.

Based on the light control signal 314 and the lightcurrent information 333, the light control unit 123*c* of the head control unit 123 generates a drive current 316 with respect to the light source. Then, the head control unit 123 supplies the generated drive current 316 to the magnetic head 110.

A light source (such as laser element) (not illustrated) of the magnetic head 110 generates light (such as laser beam) according to the input drive current 316. Then, the waveguide 4 in FIG. 2 guides the laser beam generated in the light source to the near-field light element 5. Then, the near-field light element 5 converts the laser beam into near-field light and emits the converted near-field light to a part of a recording surface of the magnetic disk 50. Accordingly, a temperature is regionally increased on the recording surface of the magnetic disk 50.

Then, the writing magnetic pole 61 of the magnetic head 110 applies a magnetic field to the part where a temperature is increased and magnetically records data into the magnetic disk 50 (magnetize recording surface of magnetic disk 50 with data).

Then, based on the magnetic field (magnetization) generated in the magnetic disk 50, the read head 110*r* of the magnetic head 5 outputs, to the head control unit 123, current (hereinafter, referred to as read current) 321 corresponding to the read data. The head control unit 123 generates read data 322 based on the input read current 321 and outputs the generated data to the RWC 124.

The RWC 124 of the present embodiment detects a track offset of the magnetic head 110 based on the input read data 322. When the RWC 124 determines that the write head 110*w* of the magnetic head 110 is deviated from a track to be an object of writing, a writing operation stop signal 324 to stop the writing control is output to the hard disk control unit 122.

Figure 4:
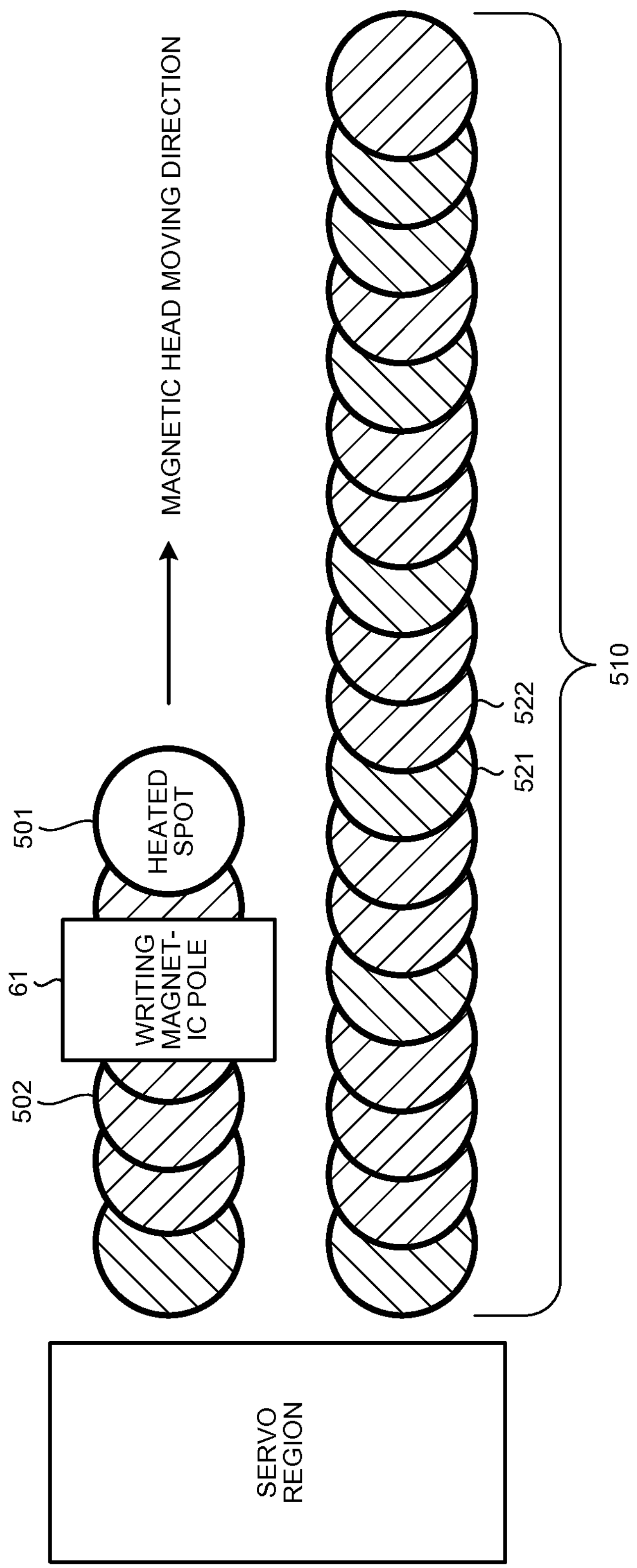
FIG. 4 is a view illustrating an example of a condition during writing into a magnetic disk of the magnetic disk apparatus of the embodiment.

FIG. 4 is a view illustrating a condition during writing into the magnetic disk 50 of the magnetic disk apparatus 100 of the present embodiment. As illustrated in FIG. 4, when near-field light is emitted from the near-field light element 5 to a part of the surface of the magnetic disk 50, a heated spot (heated part) 501 is generated on the magnetic disk 50. Then, the writing magnetic pole 61 of the magnetic head 110 applies a magnetic field corresponding to write data to the heated spot 501 which is regionally heated, that is, coercivity of which is decreased.

In the present embodiment, near-field light emitted from the near-field light element 5 is repeatedly switched on and off in a predetermined cycle. Accordingly, a region 502 on the magnetic disk 50 in which region magnetization reversal is caused is formed according to a shape of the heated spot 501 generated during light being on.

Thus, on the track of the magnetic disk 50, a region group 510 which is magnetized according to a shape of the heated spot 501 is formed. In the example illustrated in FIG. 4, different directions (polarity) of perpendicular magnetization are indicated by a difference in shading. For example, perpendicular magnetization is in a downward direction (direction from surface of disk toward inner side thereof) in a region 521 and perpendicular magnetization is in an upward direction (direction from inner side of disk toward surface thereof) in a region 522.

Figure 5:
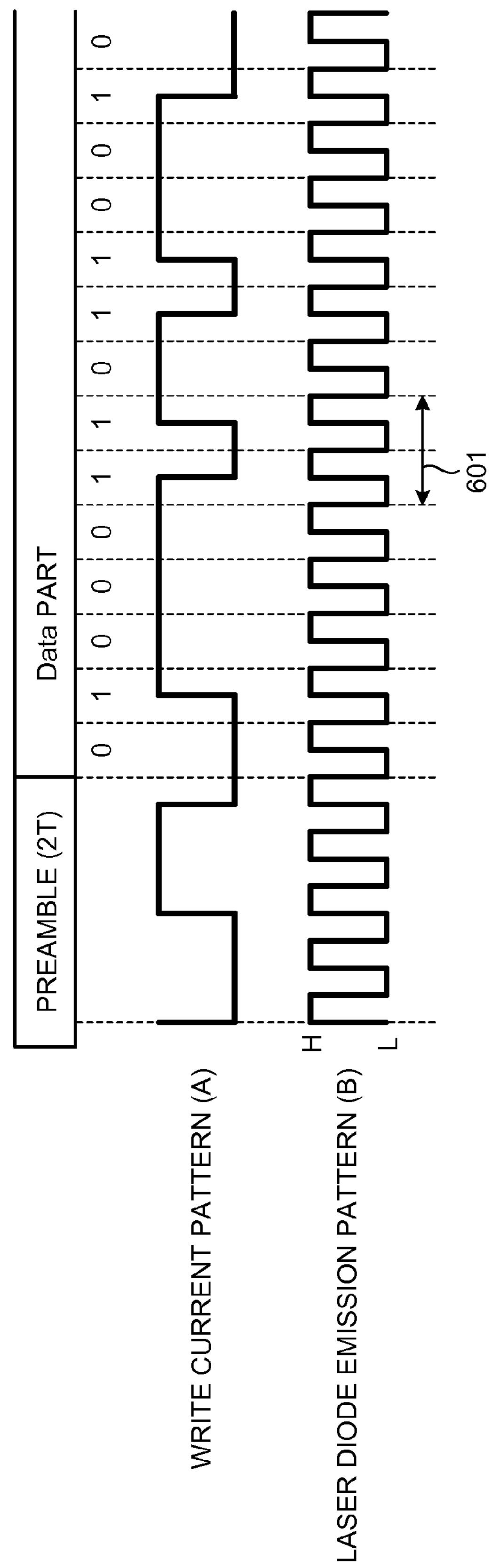
FIG. 5 is a view illustrating an example of a control signal of when data is written into the magnetic disk apparatus of the embodiment.

FIG. 5 is a view illustrating an example of a control signal during writing of data into the magnetic disk apparatus 100 of the present embodiment.

A pattern of a write current of the present embodiment is illustrated in (A) in FIG. 5 and an emission pattern of the light source (laser diode) is illustrated in (B) in FIG. 5. In (B), an L level indicates light being off and an H level indicates light being on. For example, as indicated in a time zone 601, a frequency to switch on and off of the light source is twice as high as a frequency of the minimum T of the write data. In other words, at timing where a write current is switched (changed), a drive frequency is set in such a manner that the light source (laser diode) is switched from being off to on. The frequency of the minimum T of the write data is a frequency corresponding to a cycle of when an interval of switching polarity of a bit becomes the smallest during writing of the write data into the magnetic disk 50. The frequency of the minimum T of the write data matches with a frequency of a clock to be a reference of the write data.

That is, at a moment at which polarity of a bit recorded into the magnetic disk 50 is switched, control is performed in such a manner that light from the light source is emitted and coercivity is decreased. Accordingly, magnetization reversal at timing at which polarity of a bit is switched is performed clearly. In such a manner, in the present embodiment, according to a write current pattern (A) and a laser diode irradiation pattern (B) in FIG. 5, the region group 510 magnetized according to a shape of the heated spot 501 illustrated in FIG. 4 is generated.

In the present embodiment, based on a positional relationship between the region group 510 and the read head 110*r*, it is determined whether a track offset occurs. The present embodiment is an example in which the determination is performed in the RWC 124.

Note that by switching on and off of a light source, it is possible to control heat of the light source compared to a case where the light source is on all the time. Thus, a longer life of the light source can be realized.

Note that in the present embodiment, a case where a drive frequency to switch on and off of the light source is twice as high as the frequency of the minimum T of the write data will be described. However, being twice as high as the frequency of the minimum T of the write data is not the limitation and it is only necessary to be an even multiple equal to or larger than two.

In such a manner, the writing magnetic pole 61 outputs a recording magnetic field in such a manner that the write data is written based on the frequency of the minimum T. Here, the near-field light element 5 switches on and off of light, which is emitted to the magnetic disk 50, at a frequency to be an even multiple of the frequency of the minimum T of the write data.

Figure 6:
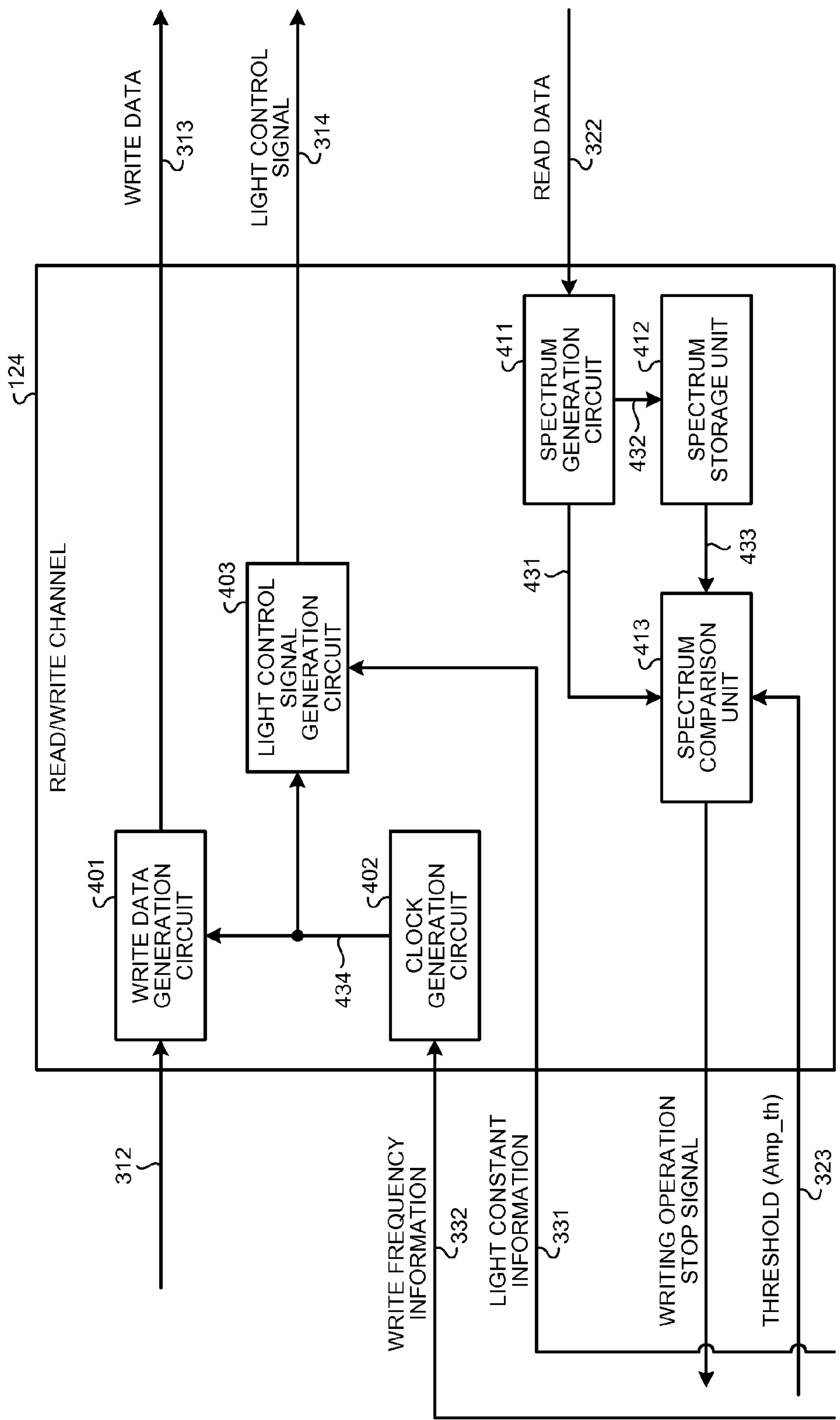
FIG. 6 is a block diagram illustrating a configuration of an RWC of the embodiment.

Next, a configuration of the RWC 124 will be described. FIG. 6 is a block diagram illustrating a configuration of the RWC 124 of the present embodiment.

As illustrated in FIG. 6, the RWC 124 includes a configuration to generate write data 313 to perform recording into the magnetic disk 50, a configuration to generate the light control signal 314 to generate light, and a configuration to detect a track offset of the write head 110*w* of the magnetic head 110.

The RWC 124 of the present embodiment includes a write data generation circuit 401, a clock generation circuit 402, a light control signal generation circuit 403, a spectrum generation circuit 411, a spectrum storage unit 412, and a spectrum comparison unit 413.

Based on the write frequency information 332 read from the storage unit 125, the clock generation circuit 402 generates a clock signal 434 to be a reference clock of the write data and transmits the clock signal 434 to the write data generation circuit 401 and the light control signal generation circuit 403.

The write data generation circuit 401 receives predetermined data 312 from the hard disk control unit 122 and receives the clock signal 434 from the clock generation circuit 402. For example, the write data generation circuit 401 is synchronized with the clock signal 434 and generates the write data 313, which is to perform writing into the magnetic disk 50, according to the data to be written 312 received from the hard disk control unit 122. The write data generation circuit 401 outputs the generated write data 313 to the head control unit 123.

The light control signal generation circuit 403 generates the light control signal 314 based on the light constant information 331 read from the storage unit 125 and the clock signal 434 from the clock generation circuit 402. The light constant information 331 is information indicating a constant to make a cycle of on and off of the light source shorter than a cycle of a clock (that is, cycle of writing in unit of bit) to be a reference of the write data and is set, for example, as "2".

For example, according to the following expression (1), the light control signal generation circuit 403 generates the light control signal 314.

Cycle of light control signal=Clock cycle/light constant information (such as positive even number "2" or the like) (1)

Accordingly, the cycle of the light control signal becomes 1/n (n=even number equal to or larger than two) times as long as the cycle of the clock to be a reference of the write data. In other words, a frequency to perform on/off control of the light source becomes an even-number multiple of the frequency of a clock to be a reference of the write data.

Then, the light control signal generation circuit 403 of the present embodiment outputs the generated light control signal 314 to the head control unit 123.

Accordingly, the write element (writing magnetic pole) 61 of the magnetic head 110 outputs a magnetic field in a cycle which is a natural-number multiple of the cycle of the clock to be the reference of the write data. Then, the irradiation unit (near-field light element 5) switches on and off of light in a cycle to be "1/positive even number" of a "clock to be a reference of write data."

With the above-described configuration, the RWC 124 transmits the write data 313 and the light control signal 314 to the head control unit 123. Accordingly, the head control unit 123 controls the magnetic head 110, whereby control of writing data into the magnetic disk 50 is performed. When the writing control is performed, read data 322 read by the read head 110*r* of the magnetic head 110 is transmitted to the RWC 124 through the head control unit 123. Then, the RWC 124 of the present embodiment can detect a track offset of the write head 110*w* of the magnetic head 110 from the read data 322.

The spectrum generation circuit 411 performs FFT processing with respect to the read data 322 received from the head control unit 123 and generates a spectrum (amplitude distribution with respect to frequency axis) of the read data. Note that the present embodiment is not what limits a timing to generate a spectrum and setting is performed according to an embodiment. For example, a spectrum may be generated once or a plurality of times between a previous servo region and a next servo region.

The spectrum storage unit 412 stores information of a spectrum generated by the spectrum generation circuit 411. The spectrum storage unit 412 stores information of a spectrum generated from read data read from a position where no track offset occurs. For example, immediately after positional control of the magnetic head 110 is performed in a servo region, it can be estimated that no track offset occurs. Thus, the spectrum storage unit 412 of the present embodiment stores information of a spectrum generated from read data which is read at a position just behind the servo region. The spectrum acquired in such a state is also referred to as a reference spectrum.

Based on a spectrum (reference spectrum) of read data at a position just behind the servo region of the magnetic disk 50 and a spectrum generated from read data read by the read head 110*r* at a position after the position just behind the servo region, the spectrum comparison calculation unit 413 detects whether a track offset of the writing magnetic pole 61 of the magnetic head 110*w* is generated in a case where the read head 110*r* reads read data while writing into a recording region of the magnetic disk 50 is performed by the write head 110*w*.

Here, a several examples of a spectrum generated in the spectrum generation circuit 411 will be described.

Figure 7:
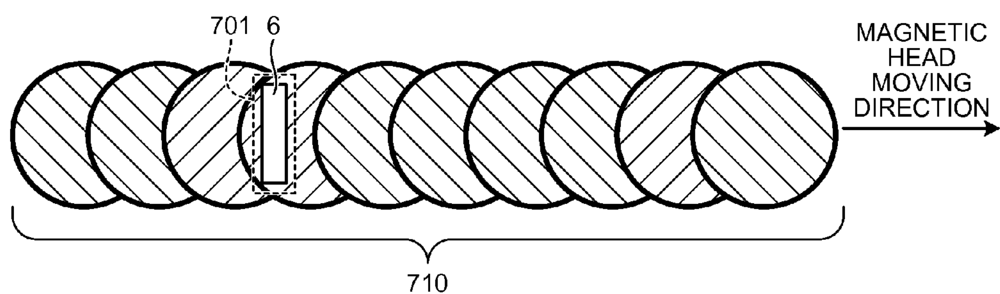
FIG. 7 is a view illustrating an example of a first positional relationship of when a read head reads data from the magnetic disk of the embodiment.

FIG. 7 is a view illustrating a first positional relationship of when the read element (magnetoresistive element) 6 of the read head 110*r* reads data from the magnetic disk 50 of the present embodiment. In the example illustrated in FIG. 7, an example in which the read element 6 reads data, at a position 701 where no track offset occurs (that is, at position in the region), with respect to a track including a region group 710 magnetization-reversed according to a shape of a heated spot is illustrated.

Figure 8:
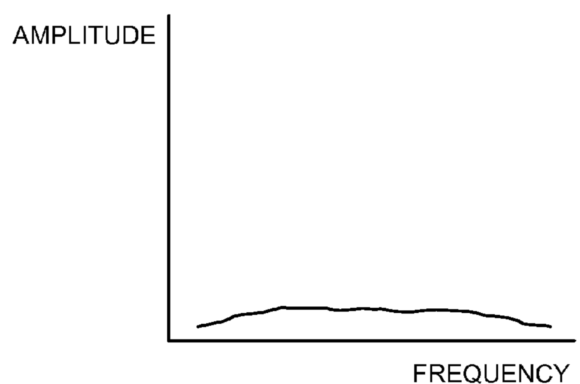
FIG. 8 is a graph illustrating an example of a result of a spectrum analysis with respect to a read data read by the read head from a position illustrated in FIG. 7.

FIG. 8 is a graph illustrating an example of a result of a spectrum analysis of read data read by the read element (magnetoresistive element) 6 of the read head 110*r* at the position 701 illustrated in FIG. 7. As illustrated in FIG. 8, in a spectrum generated from the read data read at the position 701, there is not a frequency with amplitude which is large compared to that in a different frequency band. In other words, an amplitude level at each frequency is substantially even.

Figure 9:
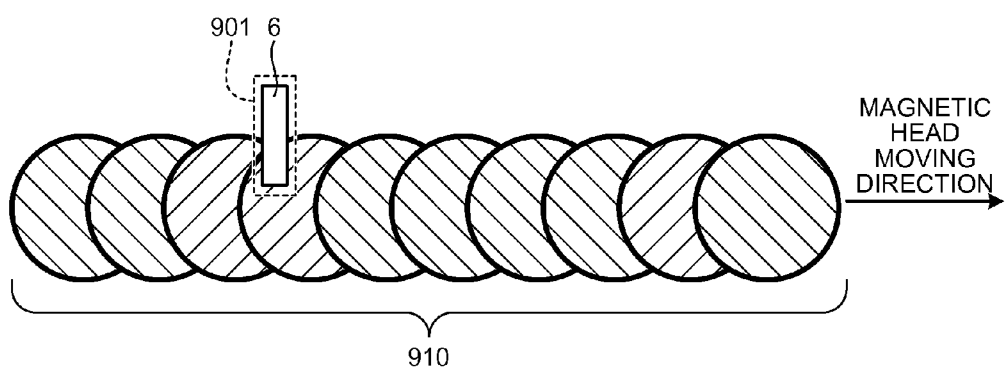
FIG. 9 is a view illustrating an example of a second positional relationship of when the read head reads data from the magnetic disk of the embodiment.

FIG. 9 is a view illustrating a second positional relationship of when the read element (magnetoresistive element) 6 of the read head 110*r* reads data from the magnetic disk 50 of the present embodiment. In the example illustrated in FIG. 9, an example in which the read element 6 reads data, at a position 901 where a track offset occurs (that is, at position on outline of the region group), with respect to a track including a region group 910 magnetization-reversed according to a shape of the heated spot is illustrated.

Figure 10:
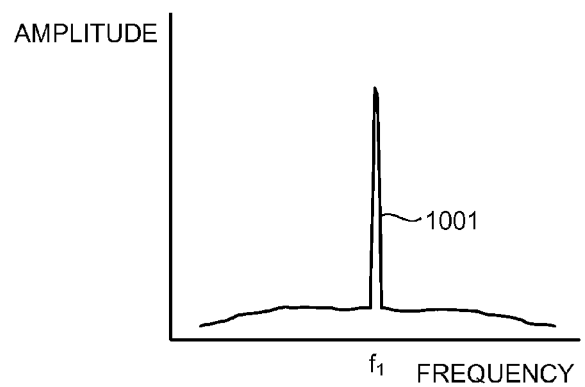
FIG. 10 is a graph illustrating an example of a result of the spectrum analysis with respect to a read data read by the read head from the position illustrated in FIG. 9.

FIG. 10 is a graph illustrating an example of a result of a spectrum analysis of read data read by the read element (magnetoresistive element) 6 of the read head 110*r* at the position 901 illustrated in FIG. 9. As illustrated in FIG. 10, in a spectrum generated from the read data read at the position 901, amplitude 1001 becomes large at a frequency f1 compared to that in a different frequency band That is, when the read head 110*r* reproduces (reads) a vicinity of an outline a region group magnetization-reversed according to a shape of a heated spot, in a result of the spectrum analysis of the read data read by the read head 110*r*, amplitude of the frequency f1 indicating the outline becomes large.

In such a manner, according to a position of the read head 110*r*, amplitude of a frequency of a spectrum varies. Thus, in the present embodiment, by comparing a spectrum of read data read in a state in which no track offset occurs and a spectrum of read data, it is detected whether a track offset is occurs when the read data is read.

Figure 11:
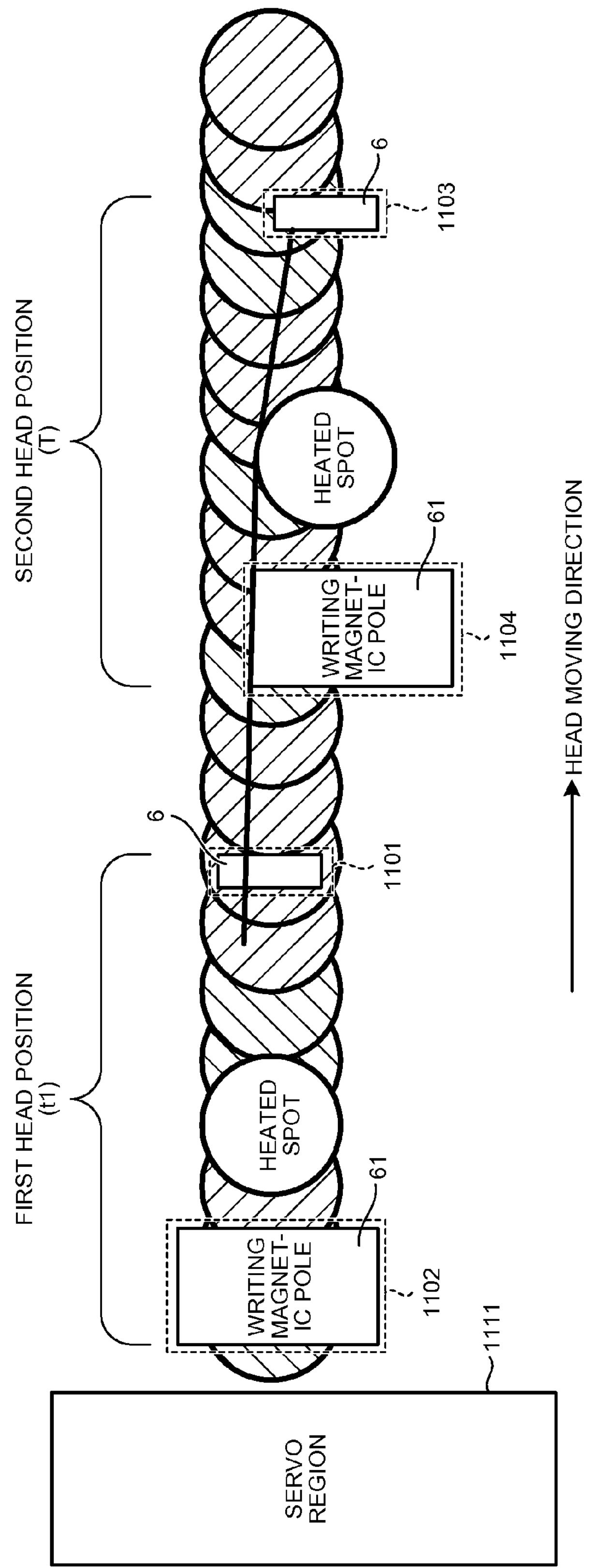
FIG. 11 is a view illustrating an example of a positional relationship of the magnetic head in a case where a track offset occurs in the embodiment.

FIG. 11 is a view illustrating an example of a positional relationship of the magnetic head 110 in a case where a track offset occurs in the present embodiment. As illustrated in FIG. 11, at a first head position (time t1) just behind the servo region, the writing magnetic pole 61 of the write head 110*w* is at a position 1102 in the track and the read element 6 of the read head 110*r* is at a position 1101 in the track. Read data read at such a position 1101 is output to the spectrum generation circuit 411. Then, the spectrum generation circuit 411 generates a spectrum from the input read data and stores the generated spectrum into the spectrum storage unit 412. Accordingly, for example, a spectrum such as the one illustrated in FIG. 8 is stored.

Then, at a second head position (time T) after a certain period of time from the start of the writing control, the writing magnetic pole 61 is at a position 1104 where deviation from the track is started and the read head 110*r* is at a position 1103 deviated from the track (that is, position on outline of region group magnetization-reversed according to shape of heated spot). Read data read at such a position 1103 is output to the spectrum generation circuit 411. Then, the spectrum generation circuit 411 generates a spectrum from the input read data and outputs the generated spectrum to the spectrum comparison calculation unit 413. As the output spectrum, a spectrum illustrated in FIG. 10 is considered, for example.

As needed, the spectrum comparison calculation unit 413 of the present embodiment compares a spectrum (such as spectrum illustrated in FIG. 8 and is parameter Amp_t1 in expression (2)) stored in the spectrum storage unit 412 and a spectrum (such as spectrum illustrated in FIG. 10 and is parameter Amp_T in expression (2)) kept input by the spectrum generation circuit 411. By the comparison, it is determined whether a track offset occurs. Note that the comparison is performed according to the following expression (2). Then, when the following expression (2) is satisfied, it is determined that a track offset occurs.

$$Amp\_th < |Amp\_t1 - Amp\_t| \quad (2)$$

When the expression (2) is satisfied and it is determined that a track offset occurs, the spectrum comparison calculation unit 413 outputs a writing operation stop signal to the hard disk control unit 122. Accordingly, the hard disk control unit 122 stops writing control with respect to the magnetic disk 50. Note that a threshold Amp_th in the expression (2) is a parameter input from the hard disk control unit 122. In the present embodiment, the hard disk control unit 122 outputs the threshold Amp_th corresponding to a track currently-read in the magnetic disk 50 to the RWC 124. Also, the hard disk control unit 122 may perform control to stop emission of light from the irradiation unit (near-field light element 5) instead of stopping control of writing into the magnetic disk 50.

In such a manner, when determining that a track offset occurs, the RWC 124 stops control of writing by the writing magnetic pole 61 of the magnetic head 110 by outputting a writing operation stop signal.

Based on a spectrum of the read data read by the read head 110*r* at the position just behind the servo region of the magnetic disk 50 and a spectrum of read data currently read by the read head 110*r* thereafter, the RWC 124 of the present embodiment detects whether a track offset occurs when the current read data is read. That is, in the present embodiment, a spectrum of the read data at the position just behind the servo region of the magnetic disk 50 is used for comparison. In other words, a spectrum of the read data to be compared only needs to be a spectrum of read data at a position after positioning (servo) control is performed based on the servo region of the magnetic disk 50. Also, even when a position is not the position after the positioning control is performed based on the servo region, in a case where the position of the magnetic head 110 is specified, a spectrum of read data at the position can be used for comparison.

In the present embodiment, on/off of light emitted by the near-field light element 5 is switched, whereby a region magnetization-reversed according to a shape of the heated spot generated by the magnetic disk 50 becomes clear. Accordingly, it becomes possible to detect whether a track offset occurs based on amplitude of a frequency indicating an outline of the region.

Figure 12:
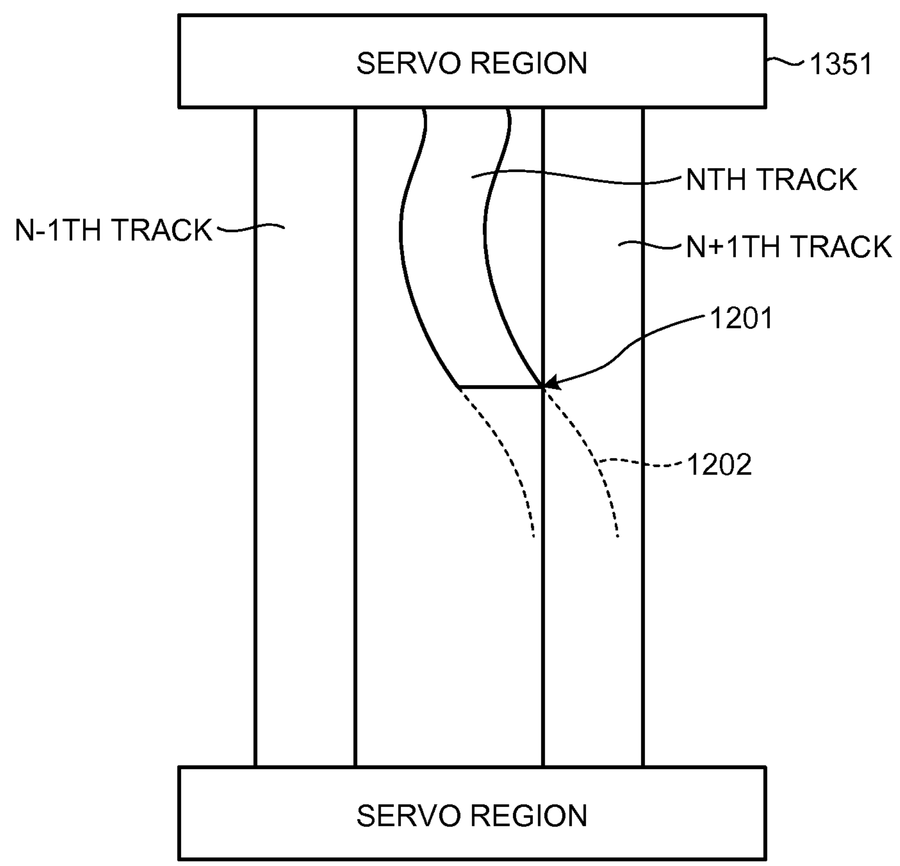
FIG. 12 is a view illustrating an example of a trace of a track of when writing control is stopped.

FIG. 12 is a view illustrating an example of a trace of the magnetic head of when the control of writing is stopped. In the example illustrated in FIG. 12, control of writing into an Nth track is performed. Then, at the position 1201, control of writing is stopped since a difference between a spectrum (Amp_t1) stored in the spectrum storage unit 412 and a spectrum (Amp_T) generated from read data at the position 1201 becomes equal to or larger than the threshold Amp_th.

Thus, it is possible to stop control of writing data before control of writing into an N+1th track is performed at the position 1202, for example, by disturbance or the like which cannot be expected.

In the above-described embodiment, a case where the write element 61 and the read element 6 of the magnetic head 110 are included in the track when the magnetic head 110 writes data into a track and no track offset occurs has been described. However, since the magnetic head 110 of the present embodiment moves on the magnetic disk 50 on an arc with the shaft 108 as a base and the magnetic disk 50 rotates around an SPM, a skew angle is generated according to a position of a track where the magnetic head 110 performs writing with respect to the magnetic disk 50. The skew angle is an angle between a rotation direction, to which writing is performed by the magnetic head 110, of a track of the magnetic disk 50 and an extension direction of the magnetic head 110 (that is, direction where write element 61 and read element 6 are arrayed).

Thus, in the RWC 124 of the present embodiment detects whether a track offset occurs in consideration of a skew angle of the magnetic head 110.

Figure 13:
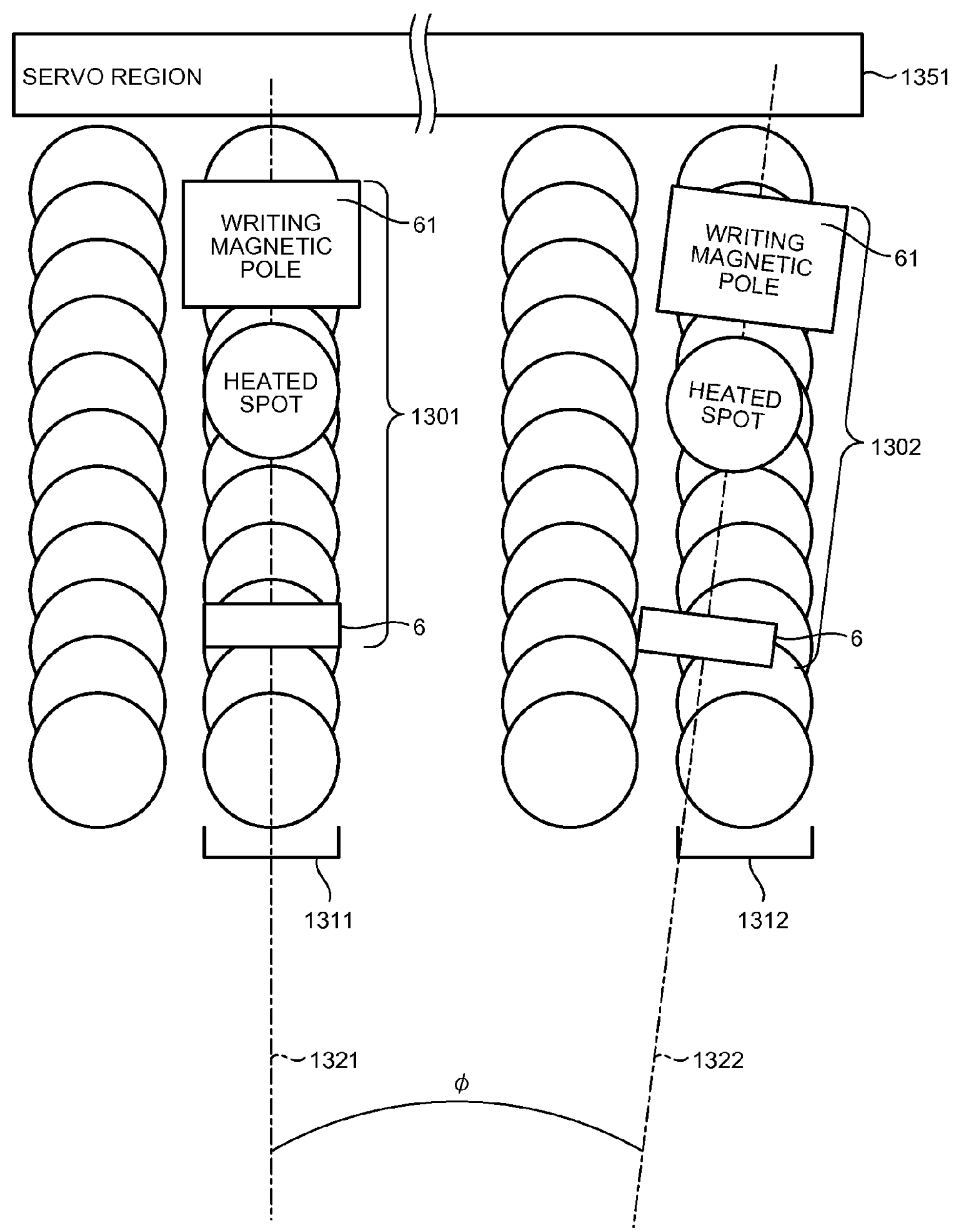
FIG. 13 is a view illustrating an example of a correspondence relationship between a position of the magnetic head and a track of the embodiment.

FIG. 13 is a view illustrating a correspondence relationship between a position of the magnetic head of the present embodiment and a track. As illustrated in FIG. 13, when the magnetic head 110 (including writing magnetic pole 61 and magnetoresistive element 6) is at the position 1301, a direction 1321 where the writing magnetic pole (write element) 61 and the read element 6 of the magnetic head 110 are arrayed and a connection direction of the track 1311 are in parallel. On the other hand, when the magnetic head 110 is at the position 1302, the direction 1322 in which the writing magnetic pole (write element) 61 and the read element 6 of the magnetic head 110 are arrayed and the connection direction of a track 1312 are not in parallel. This is because a deviation of an angle $\phi$ is generated when the magnetic head 110 performs track movement since the magnetic head 110 operates around the shaft 108.

However, in the present embodiment, a spectrum of read data read at a position just behind a servo region 1351 is used as a reference spectrum of when no track offset occurs. That is, in the present embodiment, at the position just behind the servo region 1351, it is assumed that no track offset occurs at a position of each of the writing magnetic pole 61 of the write head 110*w* and the magnetoresistive element 6 of the read head 110*r*. Then, the spectrum generation circuit 411 generates a spectrum from read data input at the position and stores the spectrum into the spectrum storage unit 412. In the following, by using the spectrum and a spectrum kept input by the spectrum generation circuit 411, a calculation expressed by the above expression (2) is performed.

As described above, the write element 61 and the read element 6 of the magnetic head 110 are arranged separately with the near-field light element 5 sandwiched therebetween. Thus, a skew angle is generated. After positioning (servo) control is performed based on a servo region, even when the write element 61 is in a track, there is a case where the read element 6 is not included in the track and passes through a track edge (that is, on outline of region group magnetization-reversed according to shape of heated spot). In this case, for example, the spectrum illustrated in FIG. 10 is used as a reference spectrum.

Then, the spectrum comparison calculation unit 413 detects whether an offset occurs based on a reference spectrum acquired according to a skew angle of the magnetic head 110 with respect to the magnetic disk 50.

In such a manner, depending on a skew angle of the magnetic head 110, a spectrum at a position just behind a servo region varies in each track. The hard disk control unit 122 calculates a threshold Amp_th corresponding to each track and outputs the threshold Amp_th to the RWC 124. Accordingly, a track offset suitable for each track can be detected.

Next, writing control in the magnetic disk apparatus 100 of the present embodiment will be described. FIG. 14 is a flowchart illustrating a procedure of the above-described control in the magnetic disk apparatus 100 of the present embodiment.

According to a write instruction from the host HS, the magnetic recording control unit 120 starts the writing control (processing S1401). Note that the writing control is not limited to control based on a write instruction from the host HS and may be performed spontaneously in the control magnetic disk apparatus 100.

Based on the read data read from the servo region, the head control unit 123 performs positioning control of the magnetic head 110 (processing S1402).

The RWC 124 inputs the read data which is read (at sector, position, or the like) immediately after the servo region by the read head 110*r* (processing S1403).

The spectrum generation circuit 411 performs spectrum analysis with respect to the input read data and generates a spectrum (processing S1404).

The spectrum generation circuit 411 stores the generated spectrum (Amp_t1) (immediately after servo data) into the spectrum storage unit 412 (processing S1405).

Based on the instruction from the host HS or the like, the hard disk control unit 122 determines whether writing is to be kept performed (processing S1406). When it is determined that writing is not to be kept performed (processing S1406: No), the processing is ended.

On the other hand, when the hard disk control unit 122 determines that the writing is to be kept performed (processing S1406: Yes), the spectrum generation circuit 411 generates a spectrum (Amp_T) from the input read data (processing S1407).

The spectrum comparison calculation unit 413 calculates a difference ($\Delta$Amp) between the spectrum (Amp_t1) stored in the spectrum storage unit 412 and the generated spectrum (Amp_T) (processing S1408).

The spectrum comparison calculation unit 413 determines whether the difference ($\Delta$Amp) is larger than a threshold (Amp_th) (processing S1409). Note that it is assumed that the threshold (Amp_th) is input as a value corresponding to a track where writing is currently performed by the hard disk control unit 122.

When the spectrum comparison calculation unit 413 determines that the difference ($\Delta$Amp) is equal to or smaller than the threshold (Amp_th) (processing S1409: No), the processing is resumed from the processing S1406.

On the other hand, when it is determined that the difference ($\Delta$Amp) is larger than the threshold (Amp_th) (processing S1409: Yes), the RWC 124 outputs a writing operation stop signal to the hard disk control unit 122. The hard disk control unit 122 performs control to stop writing into the magnetic disk 50 (processing S1410) and ends the processing.

In the present embodiment, an example in which the RWC 124 includes a configuration of generating a plurality of spectrums from read data and performing comparison calculation between the plurality of spectrums has been described. However, the configuration is not necessarily included in the RWC 124. For example, the configuration may be included in a preamplifier (head control unit). Even in a case where the configuration is included in the preamplifier (head control unit), the above-described control can be realized. Thus, reliability can be improved.

In the magnetic disk apparatus 100 of the present embodiment, by performing the above-described control, control to stop writing is performed, for example, when deviation from a track may be caused during writing control. In such a manner, the magnetic disk apparatus 100 of the present embodiment protects data of adjoining tracks and can improve reliability of data written into the magnetic disk 50.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus comprising:

a magnetic disk;

a head including a writing unit that outputs a magnetic field in a cycle to record write data into a recording region of the magnetic disk to which light is emitted, the cycle being a natural-number multiple of a first cycle and a reading unit that reads read data from the recording region of the magnetic disk;

an irradiation unit that switches on and off of the emitted light in a second cycle which is 1/positive even number of the first cycle; and a controller that detects whether an offset from a track of the writing unit occurs, during writing by the writing unit into the recording region of the magnetic disk, based on a first spectrum of first read data and a second spectrum of second read data, the first read data being read by the reading unit at a first position of the magnetic disk, the second read data being read by the reading unit at a second position which is a following position of the first position, the track including a plurality of regions magnetized according to a heated part generated in the magnetic disk when the irradiation unit switches on the light.

2. The storage apparatus according to claim 1, wherein the controller acquires the first spectrum at the first position after positioning control of the head is performed based on a servo region of the magnetic disk.

3. The storage apparatus according to claim 1, wherein the controller stops writing control performed by the writing unit of the head or emission of the light when determining that the offset occur.

4. The storage apparatus according to claim 1, wherein the controller determines whether a difference between the first spectrum and the second spectrum is equal to or larger than a threshold and detects whether the offset occurs based on a result of the determination.

5. A storage apparatus comprising:

a magnetic disk;

a head including a writing unit that outputs a magnetic field to record write data into a recording region of the magnetic disk to which light is emitted and a reading unit that reads read data from the recording region of the magnetic disk; and a controller that detects whether an offset of the writing unit occurs, during writing by the writing unit into the recording region of the magnetic disk, based on the a first spectrum of first read data and a second spectrum of second read data, the first read data being read by the reading unit at a first position of the magnetic disk, the second read data being read by the reading unit at a second position which is a following position of the first position, the first spectrum being acquired according to a skew angle of the head with respect to the magnetic disk.

6. A control method executed by a storage apparatus, the storage apparatus including a magnetic disk, and a head including a writing unit that outputs a magnetic field in a cycle to record write data into a recording region of the magnetic disk to which light is emitted and a reading unit that reads read data from the recording region of the magnetic disk, the cycle being a natural-number multiple of a first cycle, the method comprising:

switching on and off of the emitted light in a second cycle which is 1/positive even number of the first cycle;

detecting whether an offset from a track of the writing unit occurs, during writing by the writing unit into the recording region of the magnetic disk, based on a first spectrum of first read data and a second spectrum of second read data, the first read data being read by the reading unit at a first position of the magnetic disk, the second read data being read by the reading unit at a second position which is a following position of the first position, the track including a plurality of regions magnetized according to a heated part generated in the magnetic disk when the irradiation unit switches on the light.

7. The control method according to claim 6, further comprising acquiring the first spectrum at the first position after positioning control of the head is performed based on a servo region of the magnetic disk.

8. The control method according to claim 6, further comprising stopping writing control performed by the writing unit of the head or emission of the light when it is determined that the offset occurs.

9. The control method according to claim 6, further comprising determining whether a difference between the first spectrum and the second spectrum is equal to or larger than a threshold and detecting whether the offset occurs based on a result of the determination.

10. A control method executed by a storage apparatus, the storage apparatus including a magnetic disk, and a head including a writing unit that outputs a magnetic field to record write data into a recording region of the magnetic disk to which light is emitted and a reading unit that reads read data from the recording region of the magnetic disk, the method comprising:

detecting whether an offset of the writing unit occurs, during writing by the writing unit into the recording region of the magnetic disk, based on a first spectrum of first read data and a second spectrum of second read data, the first read data being read by the reading unit at a first position of the magnetic disk, the second read data being read by the reading unit at a second position which is a following position of the first position, the first spectrum being acquired according to a skew angle of the head with respect to the magnetic disk.

* * * * *